(12) United States Patent
Kawamae

(10) Patent No.: US 12,130,974 B2
(45) Date of Patent: Oct. 29, 2024

(54) HEAD MOUNTED DISPLAY SYSTEM AND HEAD MOUNTED DISPLAY USED FOR SAME, AND OPERATION METHOD FOR SAME

(71) Applicant: MAXELL, LTD., Kyoto (JP)

(72) Inventor: Osamu Kawamae, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/622,176

(22) PCT Filed: Jul. 9, 2019

(86) PCT No.: PCT/JP2019/027158
§ 371 (c)(1),
(2) Date: Dec. 22, 2021

(87) PCT Pub. No.: WO2021/005715
PCT Pub. Date: Jan. 14, 2021

(65) Prior Publication Data
US 2022/0413640 A1  Dec. 29, 2022

(51) Int. Cl.
*G06F 3/0354* (2013.01)
*G06F 3/01* (2006.01)

(52) U.S. Cl.
CPC .......... *G06F 3/03547* (2013.01); *G06F 3/011* (2013.01); *G06F 3/017* (2013.01); *G06F 2203/0331* (2013.01)

(58) Field of Classification Search
CPC ...... G06F 3/03547; G06F 3/011; G06F 3/017; G06F 2203/0331; G06F 3/014; G06F 3/012
See application file for complete search history.

(56) References Cited

U.S. PATENT DOCUMENTS 11,016,116 B2 *   5/2021   Erivantcev ............. G06F 18/00
2016/0179210 A1   6/2016   Sakai et al.
(Continued)

FOREIGN PATENT DOCUMENTS

JP   2013250707 A   12/2013
JP   2014142751 A    8/2014
(Continued)

OTHER PUBLICATIONS

J. Chokkattu, "North Focal Impressions," North Focals Review: Smartglasses We Want to Wear | Digital Trends, Feb. 15, 2019, pp. 1-30.
(Continued)

*Primary Examiner* — Grant Sitta
(74) *Attorney, Agent, or Firm* — Rimon P.C.

(57) ABSTRACT

There are provided an HMD system capable of improving operability by realizing various input operations on a head mounted display (HMD), an HMD used therefor, and an operation method therefor. Therefore, in the HMD system, an HMD allowing an operation input from an external operation device is connected to a plurality of external operation devices. The external operation device is a device worn on the body of a user who uses the HMD, includes a sensor for detecting movement, and transmits operation information by moving the external operation device. The HMD includes a short-range wireless communication unit and an operation control unit. Operation information from the plurality of external operation devices is received through the short-range wireless communication unit. The operation control unit executes a predetermined operation based on the operation information received from the plurality of external operation devices.

12 Claims, 12 Drawing Sheets

(56) References Cited

U.S. PATENT DOCUMENTS

| | | | |
|---|---|---|---|
| 2017/0168566 A1* | 6/2017 | Osterhout | G02B 27/017 |
| 2018/0158250 A1* | 6/2018 | Yamamoto | G06T 19/20 |
| 2018/0321817 A1 | 11/2018 | Terahata | |
| 2019/0025916 A1 | 1/2019 | Okumura et al. | |
| 2019/0060742 A1* | 2/2019 | Moon | G06F 3/014 |
| 2019/0265781 A1* | 8/2019 | Kehoe | G06F 3/0304 |

FOREIGN PATENT DOCUMENTS

| | | | |
|---|---|---|---|
| JP | 2015-69512 A | 4/2015 | |
| JP | 2016-76105 A | 5/2016 | |
| JP | 2016-118929 A | 6/2016 | |
| JP | 2018-190163 A | 11/2018 | |
| WO | 2017134854 A1 | 8/2017 | |
| WO | 2017/150129 A1 | 9/2017 | |

OTHER PUBLICATIONS

J. Crook, "Focals by North review: The future is (almost) here," TechCrunch, Jun. 18, 2019, 5 pages.

International Search Report issued in corresponding International Patent Application No. PCT/JP2019/027158, dated Aug. 20, 2019, with English translation.

Notice of Reasons for Refusal issued in corresponding Japanese Patent Application No. 2023-104928 dated Jan. 30, 2024.

\* cited by examiner

FIG. 3
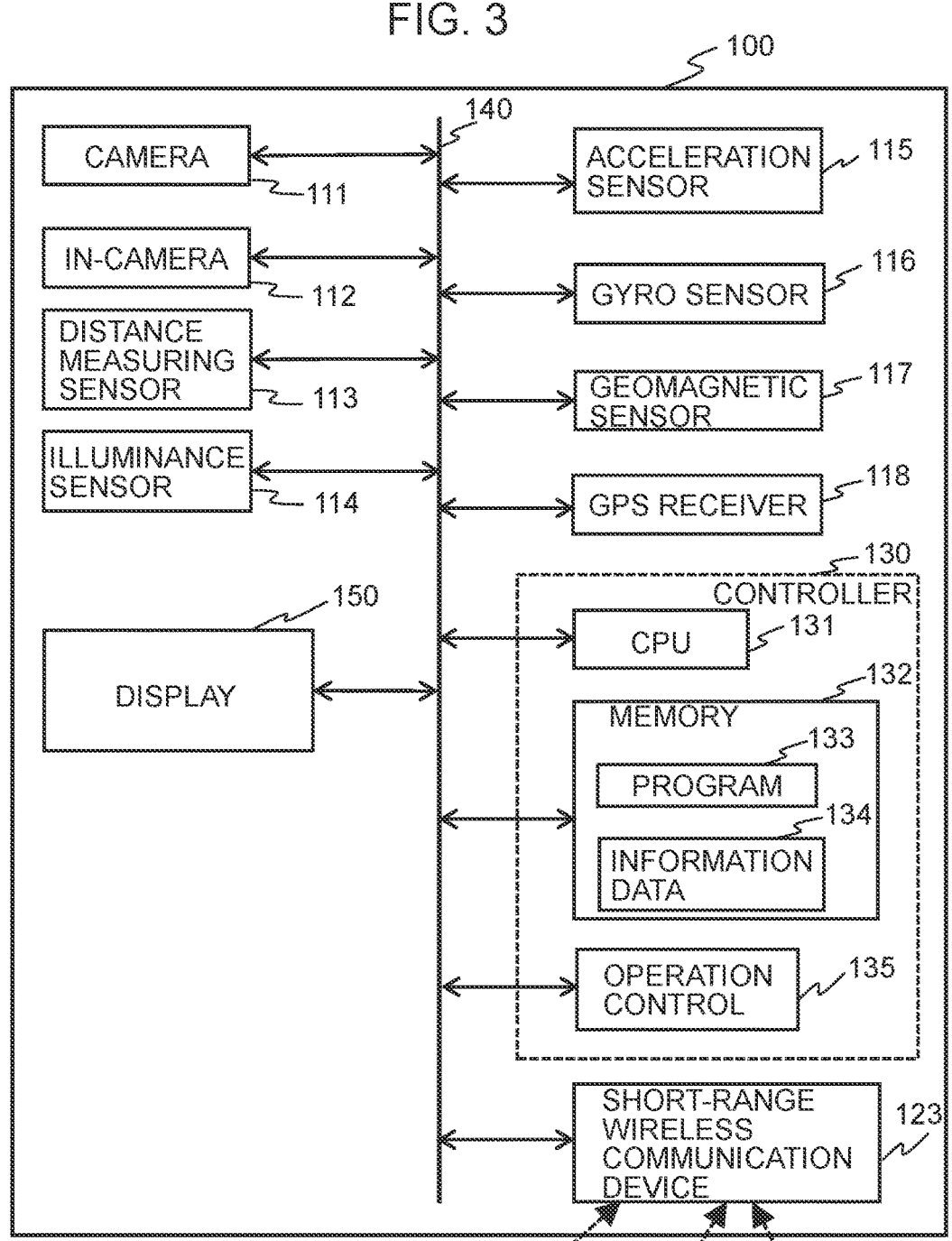
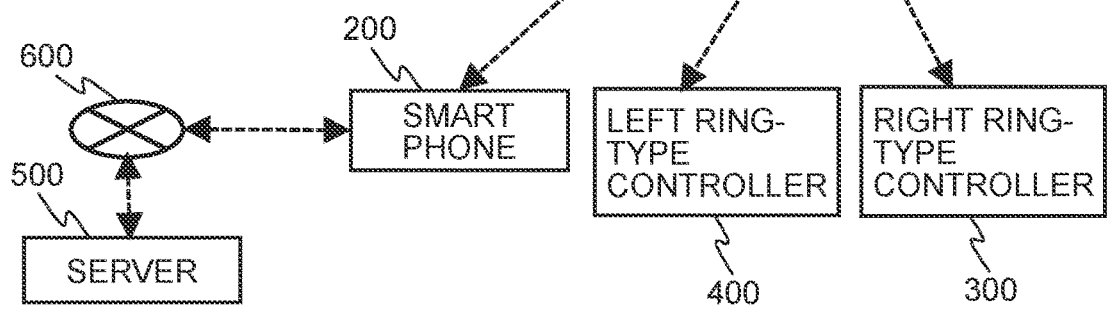

FIG. 8
(a) PAIRING OPERATION
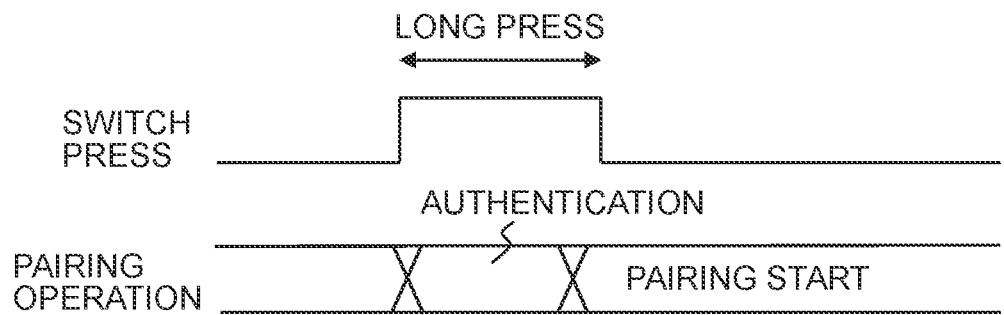
(b) ACTIVATION OPERATION
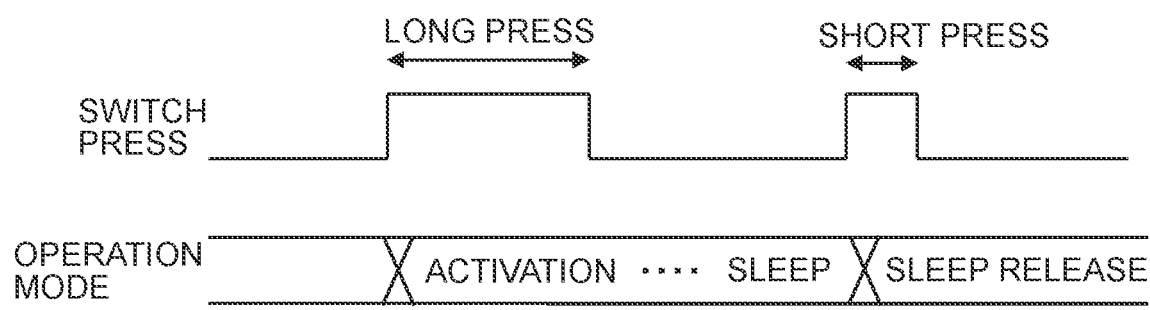

FIG. 11
(a) ACTIVATION OF TWO SIMULTANEOUS OPERATIONS
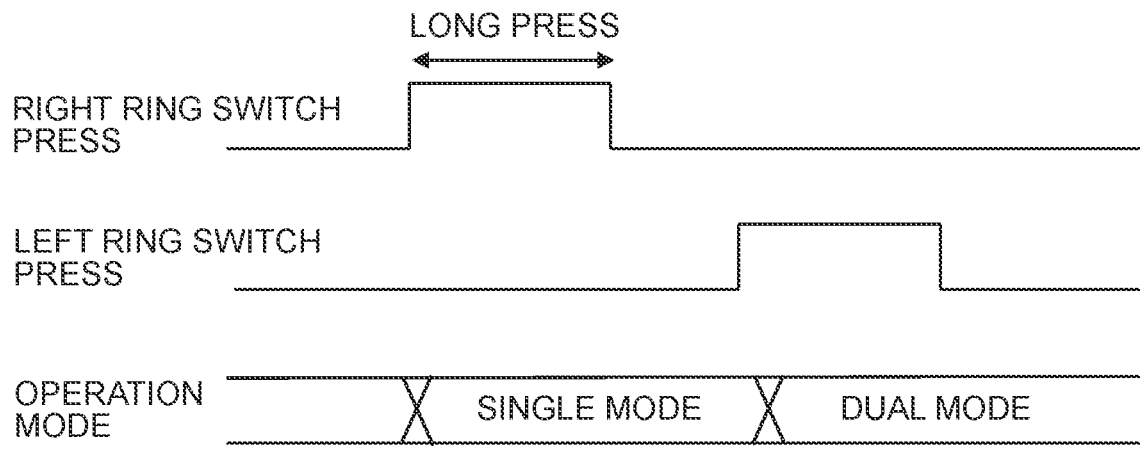
(b) OPERATION STOP
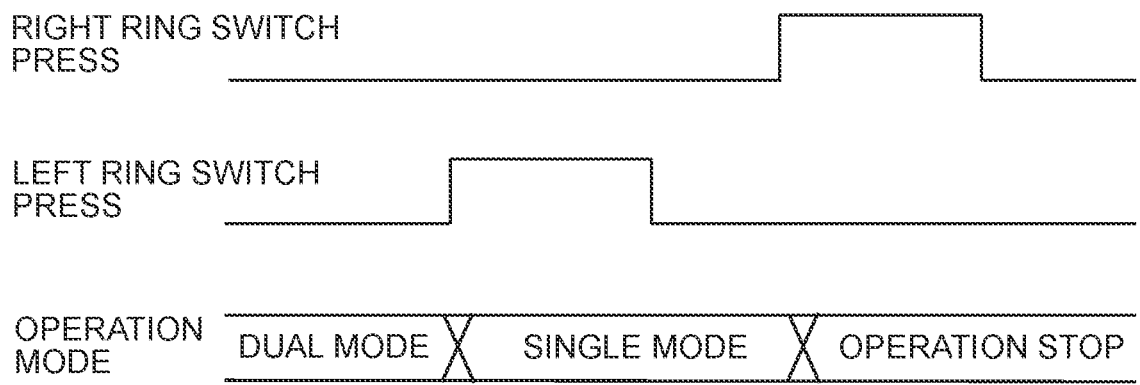

HEAD MOUNTED DISPLAY SYSTEM AND HEAD MOUNTED DISPLAY USED FOR SAME, AND OPERATION METHOD FOR SAME

CROSS-REFERENCE OF RELATED APPLICATION

This application is the U.S. National Phase under 35 U.S.C. § 371 of International Patent Application No. PCT/JP2019/027158, the entire disclosure of which Application is incorporated by reference herein.

TECHNICAL FIELD

The present invention relates to an HMD system including a head mounted display (HMD) and a controller for the HMD.

BACKGROUND ART

In recent years, an HMD having a display and worn on the head to view information is gradually spreading in the field of game applications or work support. In the HMD, both hands are free, but there are various methods for inputting an operation because there is no established method. For example, voice input has a disadvantage that it is difficult to separate the voice from ambient noise. In addition, input by gesture can be operated by performing a specific movement within a recognition range, but a wide movement range and performing a specified hand or finger movement are required. For this reason, there are restrictions in terms of movement recognition and work range.

Patent Document 1 is a related art in this technical field. Patent Document 1 discloses a ring-type device that detects the angular velocity or acceleration of movement by using a built-in sensor and transmits the information thereof.

CITATION LIST

Patent Document

Patent Document 1: JP 2016-76105 A

SUMMARY OF THE INVENTION

Problems to be Solved by the Invention

The HMD has an advantage that both hands of the user can be freely used. However, in the ring-type device disclosed in Patent Document 1, operations that can be input are limited, which causes inconvenience when handling various kinds of information. Therefore, there remains a problem that the degree of freedom of the user's operation is reduced.

The present invention has been made to solve the aforementioned problem, and an object thereof is to provide an HMD system with improved operability so that various operations can be performed on the HMD while ensuring the degree of freedom of both hands, an HMD used therefor, and an operation method therefor.

Solutions to Problems

In order to solve the aforementioned problem, the present invention is, for example, an HMD system in which an HMD allowing an operation input from an external operation device is connected to a plurality of external operation devices. The external operation device is a device worn on a body of a user who uses the HMD, includes a sensor for detecting movement, and transmits operation information by moving the external operation device. The HMD includes a short-range wireless communication unit and an operation control unit. Operation information from the plurality of external operation devices is received through the short-range wireless communication unit. The operation control unit executes a predetermined operation based on the operation information received from the plurality of external operation devices.

Effects of the Invention

According to the present invention, it is possible to provide an HMD system capable of improving operability by realizing various input operations on the HMD, an HMD used therefor, and an operation method therefor.

BRIEF DESCRIPTION OF THE DRAWINGS

FIG. 3 is a hardware configuration diagram of the HMD system in the embodiment.

FIG. 8 is a diagram showing an activation operation of the ring-type controller in the embodiment.

FIG. 11 is a diagram showing an operation of activating and stopping two ring-type controllers in the embodiment.

MODE FOR CARRYING OUT THE INVENTION

Figure 1:
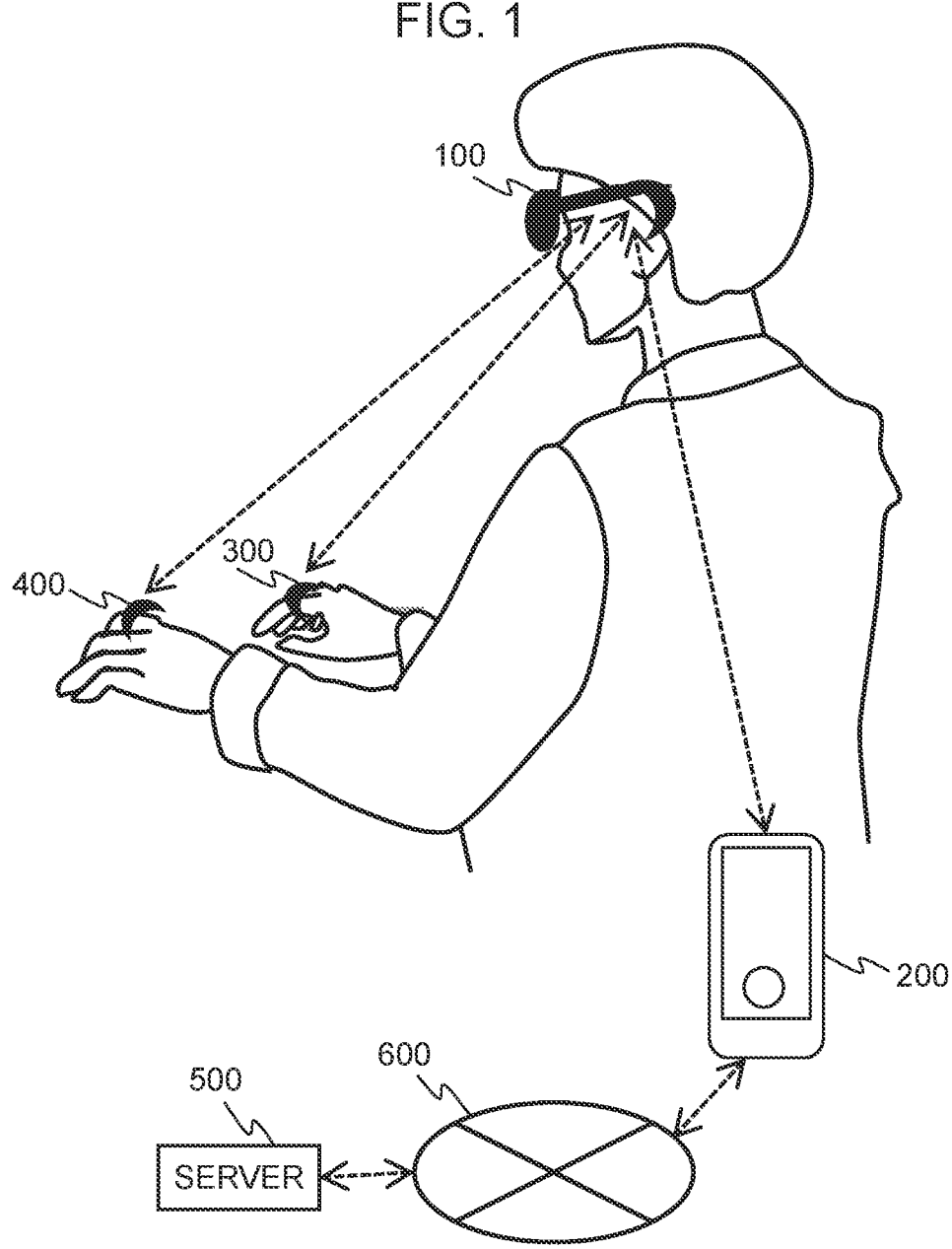
FIG. 1 is a schematic diagram of a wearing state of an HMD system in an embodiment.

Hereinafter, an embodiment of the present invention will be described with reference to the diagrams. In addition, the same components and processes are denoted by the same reference numerals throughout the diagrams, and the repeated description thereof will be omitted.

Embodiments

FIG. 1 is a schematic diagram of the wearing state of an HMD system in the present embodiment. As shown in FIG. 1, the HMD system includes an HMD 100 worn on the user's head, a smartphone 200, a right ring-type controller 300, and a left ring-type controller 400. The smartphone 200 is communicably connected to the HMD 100 through a short-range wireless communication line to transmit and receive information. In addition, information may be transmitted and received to and from the smartphone 200 by wire.

A server 500 searches for information according to an instruction from the smartphone 200 or provides the content to be displayed on the HMD 100 through an external network 600.

The right ring-type controller 300 and the left ring-type controller 400 are communicably connected to the HMD 100 through a short-range wireless communication line to transmit the operation information of the ring-type controllers to the HMD 100. Here, one or two ring-type controllers can be connected to the HMD and operated at the same time.

Figure 2:
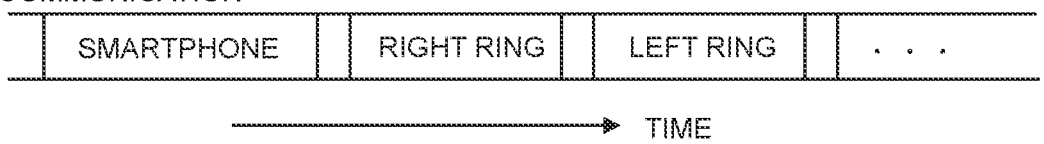
FIG. 2 is a diagram showing an operating state of short-range wireless communication of an HMD in the embodiment.

FIG. 2 is a diagram illustrating an operating state of short-range wireless communication device of the HMD in the present embodiment. As shown in FIG. 2, the short-range wireless communication of the HMD is connected to the smartphone 200, the right ring-type controller 300, and the left ring-type controller 400. Therefore, for example, it is possible to operate at the same time by dividing the wireless communication in time so as to communicate with each device.

FIG. 3 is a hardware configuration diagram of the HMD system in the present embodiment. As shown in FIG. 3, the HMD 100 includes a camera 111, an in-camera 112, a distance measuring sensor 113, an illuminance sensor 114, an acceleration sensor 115, a gyro sensor 116, a geomagnetic sensor 117, a GPS receiver 118, and a short-range wireless communication device 123, a controller 130, and a display 150. In addition, the controller 130 includes a CPU 131, a memory 132, and an operation control 135, and the memory 132 has a program 133 and information data 134.

The short-range wireless communication device 123 is a communication interface for performing short-range wireless communication between the HMD 100 and the right ring-type controller 300, the left ring-type controller 400, and the smartphone 200. The short-range wireless communication device 123 is configured to include communication devices corresponding to, for example, Bluetooth (registered trademark), IrDA (Infrared Data Association), Zigbee (registered trademark), HomeRF (Home Radio Frequency (registered trademark)), wireless LAN (IEEE802.11a, IEEE802.11b, IEEE802.11g), NFC (Near-Field-Communication), and the like.

The right ring-type controller 300 and the left ring-type controller 400 are connected to the HMD 100 through the short-range wireless communication device 123. The HMD 100 receives operation information received by the right ring-type controller 300 and the left ring-type controller 400 through the short-range wireless communication line. The received operation information is for detecting what kind of input operation has been performed by the operation control 135, and is transmitted to the CPU 131 so that processing according to the operation content is performed.

The CPU 131 loads and executes the program 133 stored in the memory 132, and reads out the information data 134 as needed to use the information data 134 for the execution process of the program 133. By using the CPU 131, the controller 130 analyzes information from various sensors, processes information of the operation control 135, transmits and receives information to and from the smartphone 200, and creates a display screen on the display 150, thereby controlling the entire HMD. Here, when the ring-type controller has a function of calculating the output of each sensor, the information regarding the movement may be calculated and processed in the ring-type controller and then transmitted to the HMD 100.

Figure 4:
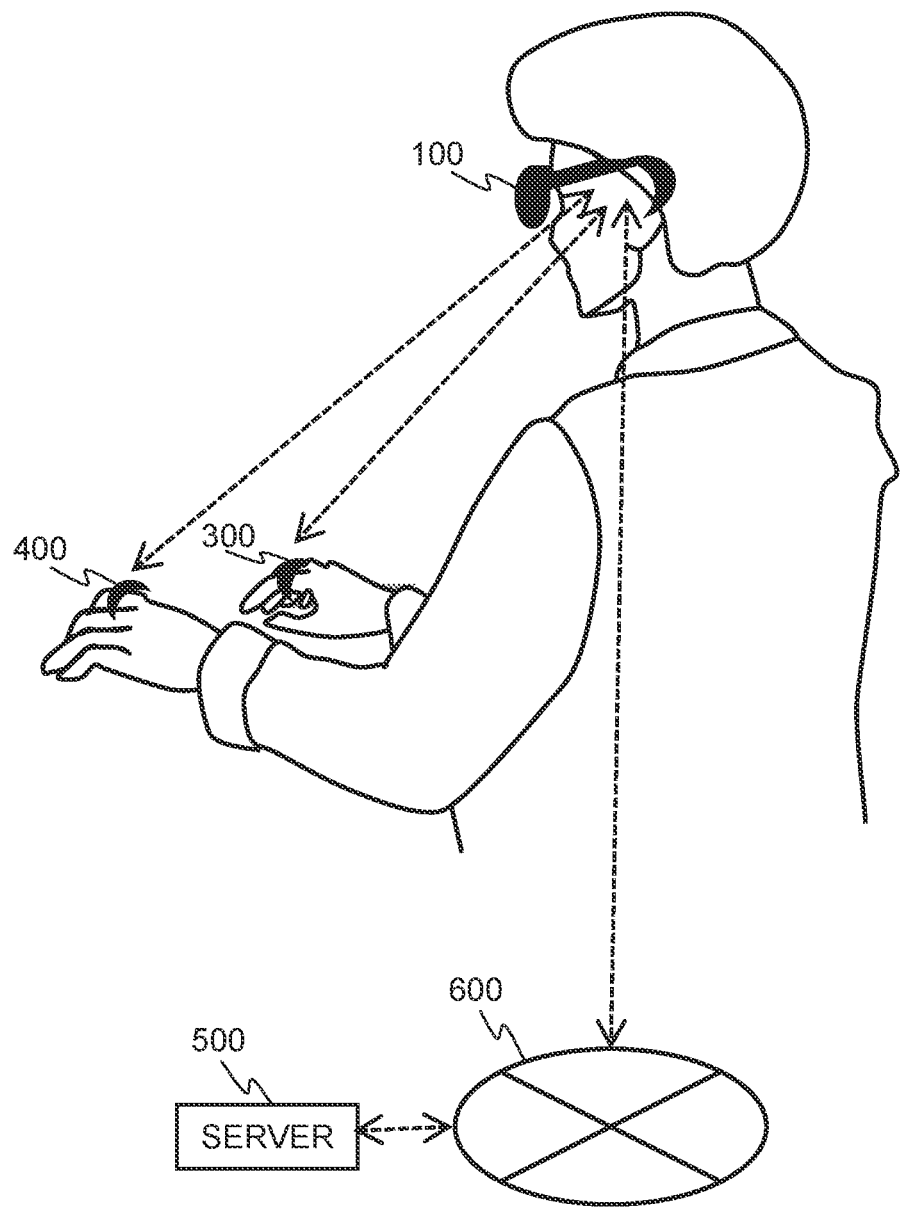
FIG. 4 is a schematic diagram of another wearing state of the HMD system in the embodiment.

FIG. 4 is a schematic diagram of another wearing state of the HMD system in the present embodiment. In FIG. 4, the same functions as in FIG. 1 are denoted by the same reference numerals, and the description thereof will be omitted. As shown in FIG. 4, the HMD 100 is configured to connect to the server 500 by itself through the external network 600 without a smartphone. In this case, the HMD has functions of calculation processing, image processing, communication processing, and the like performed by the smartphone.

Figure 5:
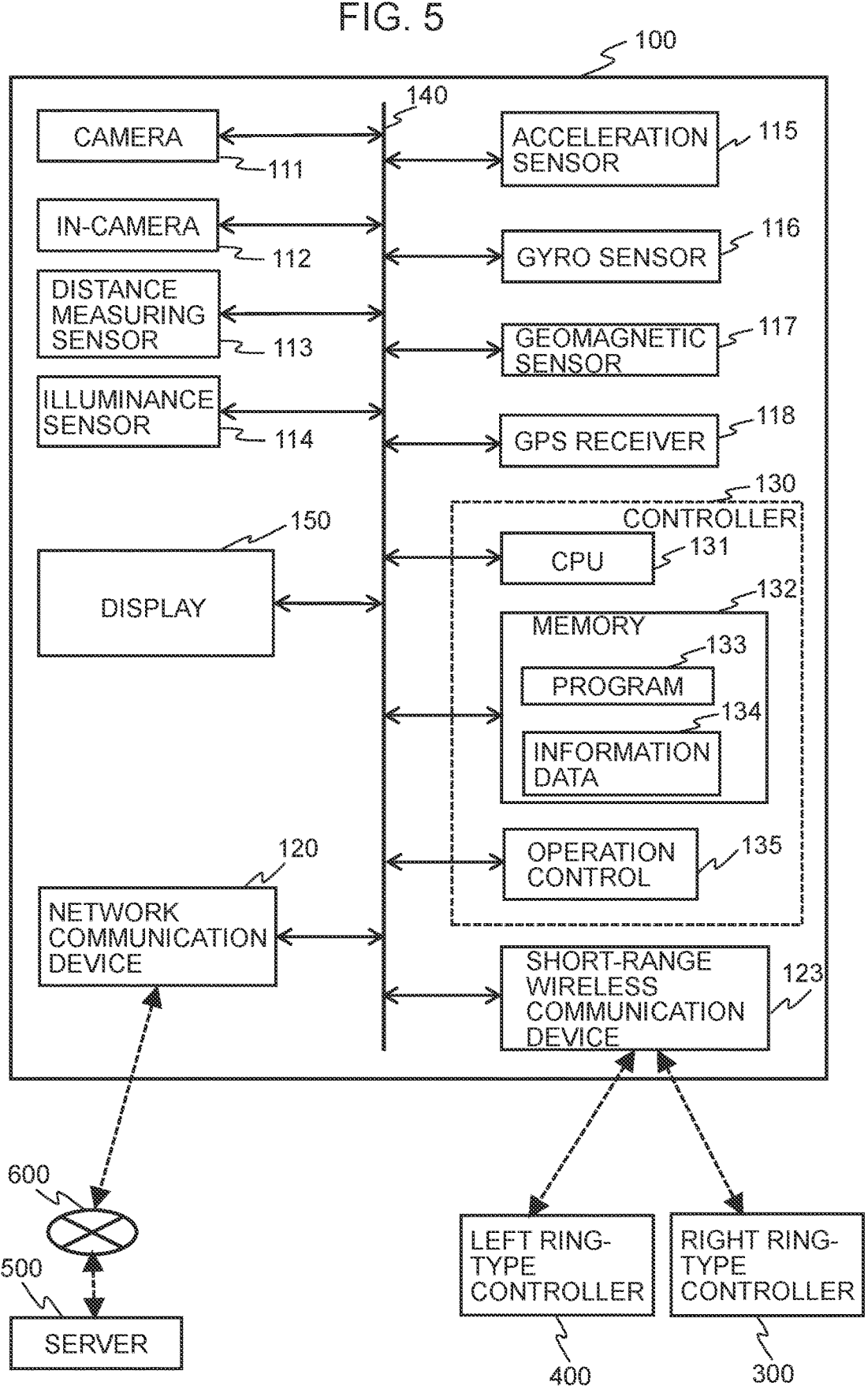
FIG. 5 is another hardware configuration diagram of the HMD system in the embodiment.

In addition, FIG. 5 is a hardware configuration diagram of an HMD system corresponding to FIG. 4. In FIG. 5, the same functions as in FIG. 3 are denoted by the same reference numerals, and the description thereof will be omitted. FIG. 5 is different from FIG. 3 in that a network communication device 120 is provided in the HMD 100, and the HMD 100 is connected to the external network 600 without a smartphone.

The network communication device 120 is a communication interface for communicating with an external server by wireless LAN, wired LAN, or base station communication, and is connected to the external network 600 to transmit and receive information to and from the server 500. The network communication device 120 is configured to include communication devices corresponding to long-distance wireless communication standards, such as W-CDMA (Wideband Code Division Multiple Access) (registered trademark) and GSM (Global System for Mobile communications) (registered trademark).

Figure 6:
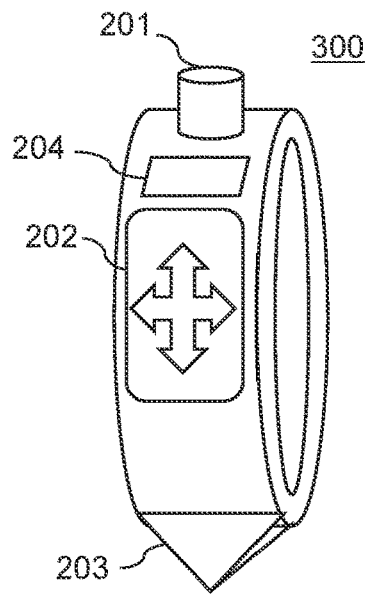
FIG. 6 is a diagram showing the appearance of a ring-type controller in the embodiment.

FIG. 6 is a diagram showing the appearance of the right ring-type controller 300 in the present embodiment. In FIG. 6, a press switch 201 can control the power supply or switch the operation by a long press or a short press operation. A touch pad 202 can detect a position touched by a human finger by using, for example, a capacitive sensing method, and can detect an operation instruction depending on which direction the position has moved. Here, as shown by the cross-shaped arrow, an example of a touch pad that can detect operations in the up, down, left, and right directions using the adjacent thumb is shown. A protrusion 203 is provided on a part of the outer circumference of the ring-type controller, so that the ring-type controller is prevented from rotating freely during operation or a predetermined position is set as a home position of the thumb to be operated. In addition, an LED 204 indicating the operation mode is mounted. In addition, the positional relationship between the push switch, the touch pad, the protrusion, and the LED is not limited to this order. In addition, the left ring-type controller 400 may have the same appearance as that in FIG. 6, or may have a structure symmetrical on the left and right sides with respect to that in FIG. 6.

Figure 7:
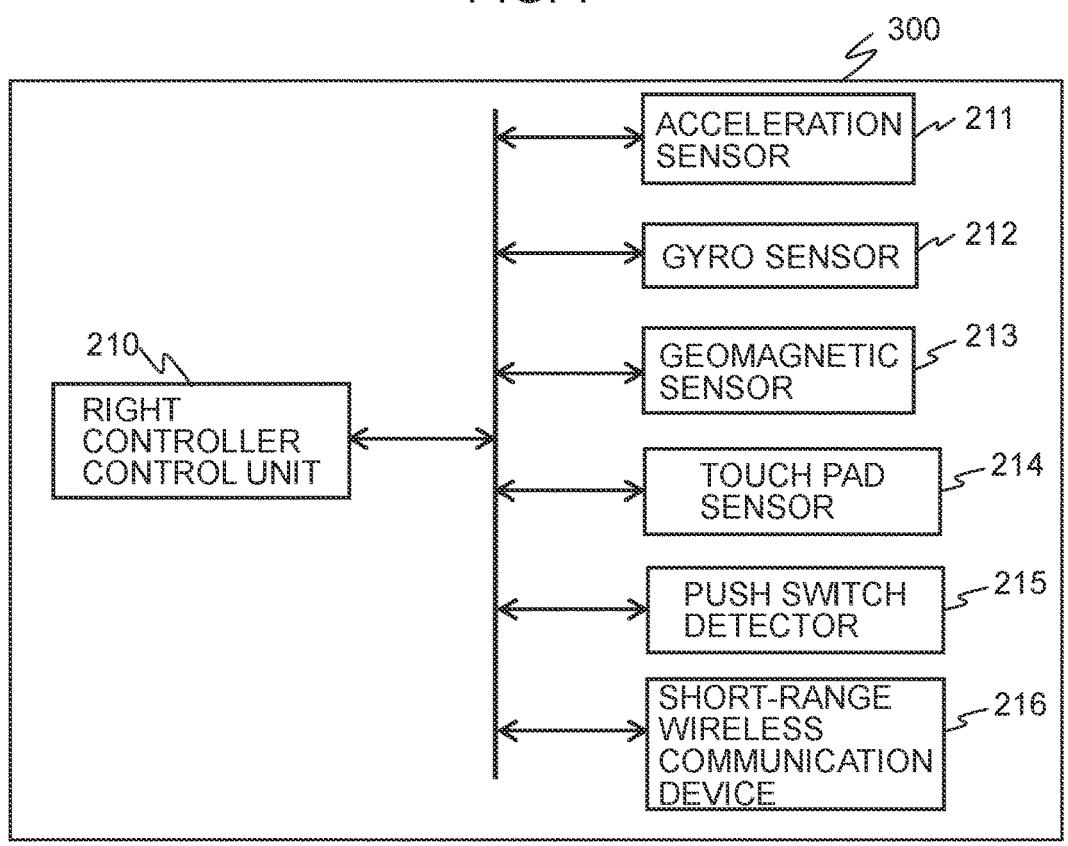
FIG. 7 is a hardware configuration diagram of the ring-type controller in the embodiment.

FIG. 7 is a hardware configuration diagram of the right ring-type controller 300. As shown in FIG. 7, an acceleration sensor 211, a gyro sensor 212, and a geomagnetic sensor 213 for detecting movement are provided, and a touch pad sensor 214 for detecting the movement direction, speed, and distance of a finger touching the touch pad, a push switch detector 215 for detecting on/off of the press switch, and a short-range wireless communication device 216 are provided. In addition, a right controller control unit 210 controls all of these. In addition, a battery, a connector for charging, an LED driver, and the like are omitted herein.

FIG. 8 is a diagram showing an activation operation of the ring-type controller in the present embodiment. As shown in FIG. 8(*a*), when pairing with the HMD by short-range wireless communication for the first time, it is possible to perform pairing by long-pressing the press switch 201 with the HMD in the pairing mode to exchanging authentication data therebetween. Once paired, the press switch 201 of the ring-type controller is long-pressed to activate the ring-type controller as shown in FIG. 8(*b*). At this time, if the paired HMD is within the range where communication can be performed, the pairing is automatically performed. In addition, when a sleep mode is set due to no operation for a while, the sleep may be released by short-pressing the press switch 201. In this manner, it is possible to input different operations according to the length of time during which the press switch is pressed.

Figure 9:
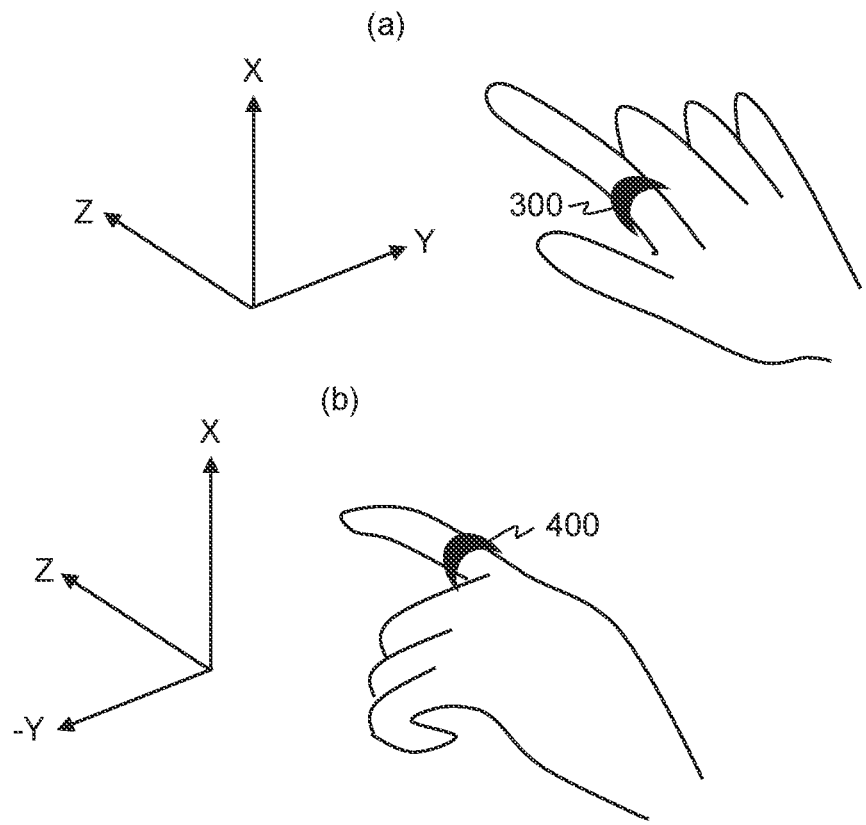
FIG. 9 is a diagram showing a vector definition of the movement direction of left and right ring-type controllers in the embodiment.

FIG. 9 is a diagram showing a vector definition of the movement direction of the left and right ring-type controllers in the present embodiment. FIG. 9(*a*) shows the right ring-type controller 300 worn on the right hand and its X, Y, and Z coordinate system. When the right ring-type controller 300 worn on the right hand moves from a certain position, the acceleration sensor 211, the gyro sensor 212, and the geomagnetic sensor 213 can detect, from the difference between the X, Y, and Z coordinates of two points having a predetermined time interval therebetween, in which direction, at what speed, and by which distance the right ring-type controller 300 has moved. In addition, FIG. 9(*b*) shows the left ring-type controller 400 worn on the left hand and its X, Y, and Z coordinate system, and the left ring-type controller 400 worn on the left hand can similarly detect how the left ring-type controller 400 has moved. By using the two left and right ring-type controllers in this manner, the two cursors can be operated independently at the same time.

Here, the ring-type controller can be operated in both a case where one ring-type controller is used and a case where left and right ring-type controllers are used independently, but various operations can be realized by using two controllers at the same time. For example, when the movement directions of the right ring-type controller 300 worn on the right hand and the left ring-type controller 400 worn on the left hand are detected with the same X, Y, and Z axes as references, it is also possible to detect the relative movement positions of the two ring-type controllers during a predetermined time interval. For example, on a smartphone, an operation of placing two fingers on the screen and widening the distance between the two points to increase the display size can be easily realized by using the two ring-type controllers.

Figure 10:
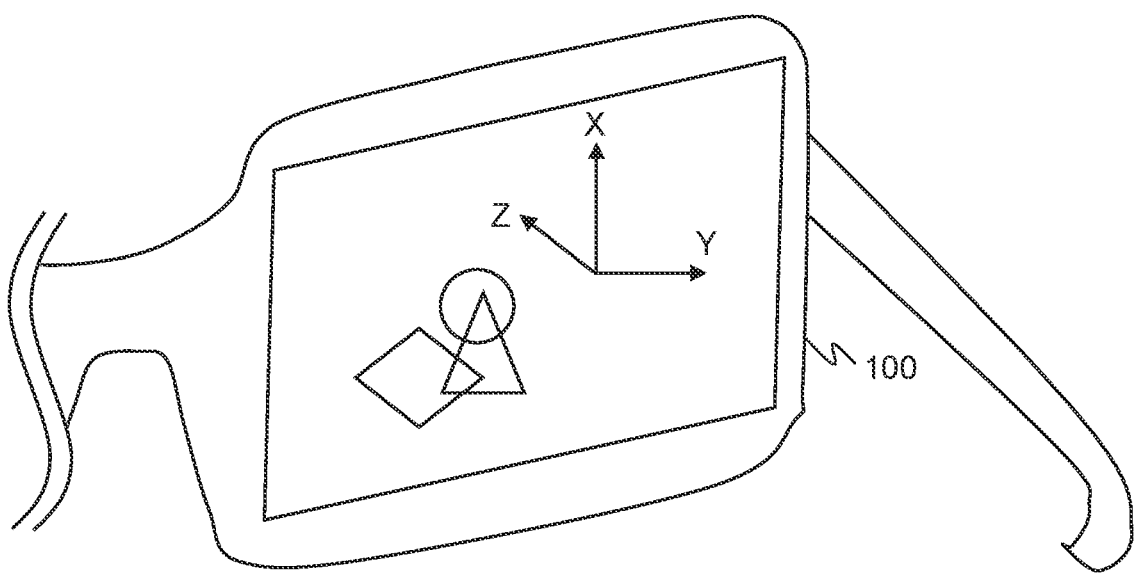
FIG. 10 is a diagram showing an HMD display in the movement direction of the ring-type controller in the embodiment.

FIG. 10 is an example showing an image object displayed on one lens unit of the HMD glasses and its movement direction. Figure objects of ○, △, □ are displayed on the glass portion of the HMD, and the objects are moved according to the movement directions X, Y, and Z of the right ring-type controller worn on the right hand in FIG. 9(*a*), for example. At this time, not only in the same plane directions X and Y as the lens surface of the HMD but also in the Z direction that is a depth direction, the objects are displayed as if the objects were moved in perspective (front and back) by using the enlargement and reduction of the figures. In this manner, it is possible to perform operations such as moving the display object in the up, down, left, right, front, and back directions by using the ring-type controllers.

FIG. 11 is a diagram showing operations when activating two ring-type controllers and when stopping the two ring-type controllers in the present embodiment. FIG. 11(*a*) shows a case of starting two simultaneous operations. By long-pressing the press switch of the right ring-type controller to activate the right ring-type controller and then long-pressing the press switch of the left ring-type controller to activate the left ring-type controller, an operation as a dual mode in which two ring-type controllers are operated at the same time is possible. In addition, as shown in FIG. 11(*b*), in the dual mode state, by long-pressing the press switch of the left ring-type controller to stop the left ring-type controller and set a single mode and then long-pressing the press switch of the right ring-type controller to stop the right ring-type controller, an operation of stopping the two ring-type controllers is possible. In this manner, it is possible to specify different operation inputs according to the relationship between the timings of pressing the respective press switches.

Figure 12:
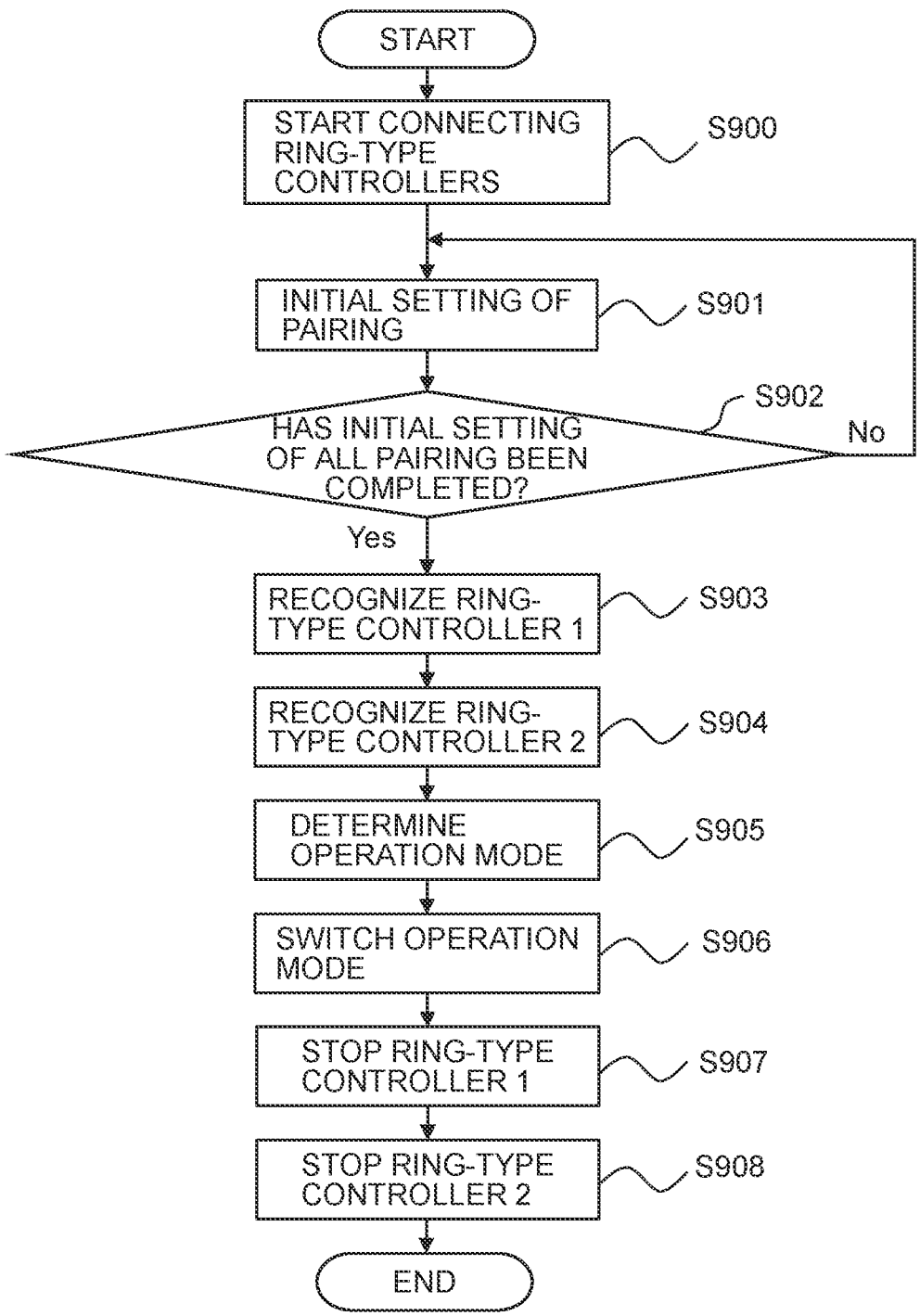
FIG. 12 is a process flowchart when connecting two ring-type controllers to the HMD in the embodiment.

FIG. 12 is a process flowchart when connecting two ring-type controllers to the HMD in the present embodiment. In FIG. 12, first, the process of connecting the ring-type controllers is started in S900. Then, in S901, the initial setting of pairing with the HMD is performed. Then, in S902, it is checked whether the pairing with all the ring-type controllers has been completed. If there is a ring-type controller for which the initial setting of the pairing has not been completed, the initial setting is performed in S901. Since the initial setting of the two pairings has been completed, S902 in this example is yes. Then, in S903, one ring-type controller is recognized to perform pairing. In S904, another ring-type controller is recognized to perform pairing in the same manner. Then, in S905, the operation mode of the two ring-type controllers is determined. If necessary, the operation mode of the two ring-type controllers is switched in S906. At the end, one ring-type controller is stopped in S907, and then another ring-type controller is stopped in S908. By such a process, the two ring-type controllers and the HMD can be paired and operated.

Figure 13:
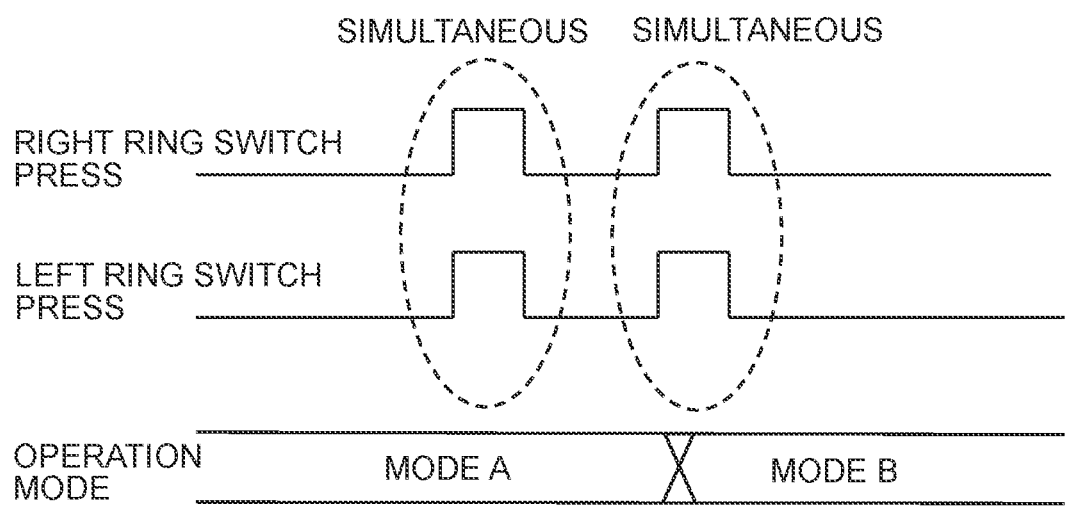
FIG. 13 is a diagram showing an operation for switching an operation mode in a dual mode in the embodiment.

FIG. 13 is a diagram showing an operation of switching the operation mode in the dual mode by using the two ring-type controllers in the present embodiment. Here, the operation mode is, for example, an application switching mode, a voice input receiving mode, a display mode such as switching the display from the right lens to the left lens, or a sunglasses mode in which the glass portion of the HMD is made into sunglasses. FIG. 13 shows an operation for switching from mode A to mode B, and shows an operation to switch the mode by pressing both the press switches twice at the same time while the two ring-type controllers are operating in the dual mode.

Figure 14:
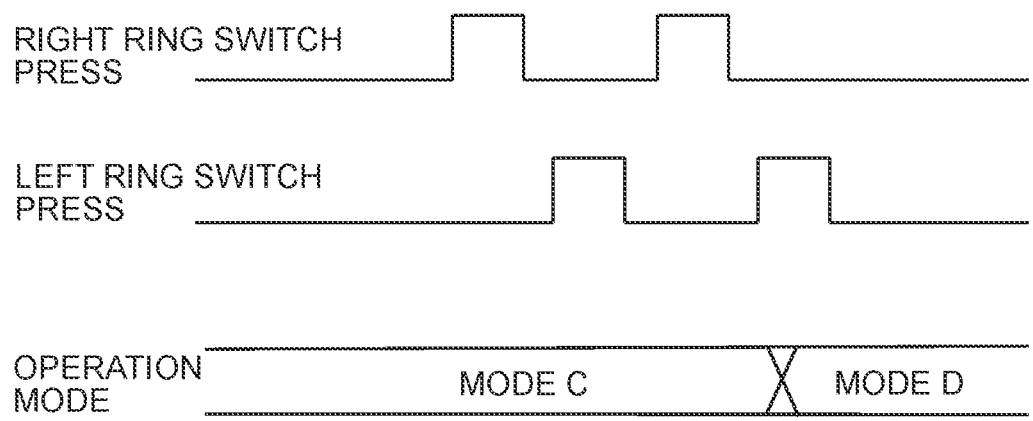
FIG. 14 is a diagram showing another operation for switching the operation mode in the dual mode in the embodiment.

FIG. 14 is a diagram showing another operation for switching the operation mode in the dual mode in the present embodiment. FIG. 14 shows an operation for switching from mode C to mode D, and shows an operation to switch the mode by pressing the left and right press switches alternately twice while the two ring-type controllers are operating in the dual mode. Here, the operation mode to which modes A to D are assigned depends on the user's settings, and is not particularly limited.

Figure 15:
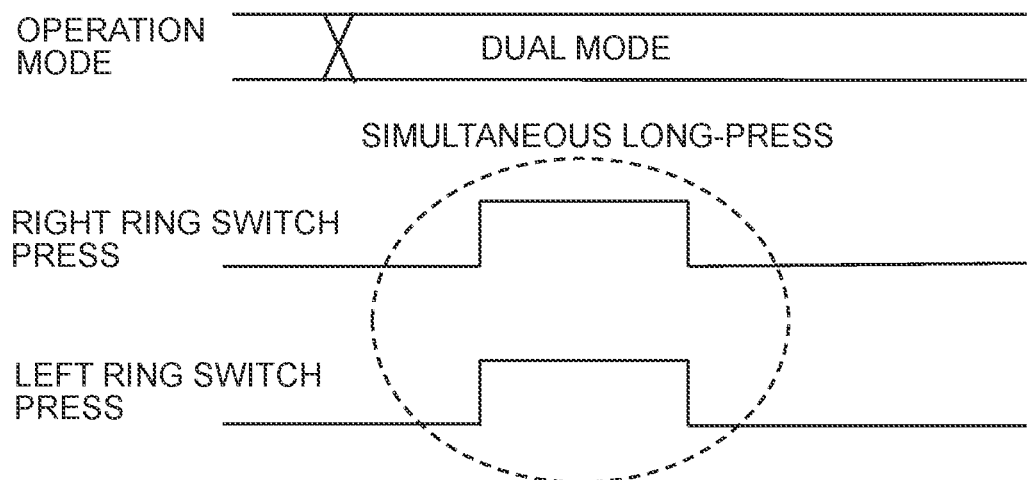
FIG. 15 is a diagram showing another operation for switching the operation mode in the dual mode in the embodiment.

In addition, FIG. 15 is a diagram showing still another operation for switching the operation mode in the dual mode in the present embodiment. As shown in FIG. 15, in the dual mode state, an operation of long-pressing the press switches of the two ring-type controllers at the same time is defined. For example, if this mode corresponds to the starting point reset for determining the starting point of the operation of the two ring-type controllers, this mode is set to detect the movement of the position with the position in space of each ring-type controller at that time as a starting point. When the two ring-type controllers move independently from the position, the trajectory of the difference is detected as the amount of change, so that it is possible to perform an operation according to the trajectory.

Figure 16:
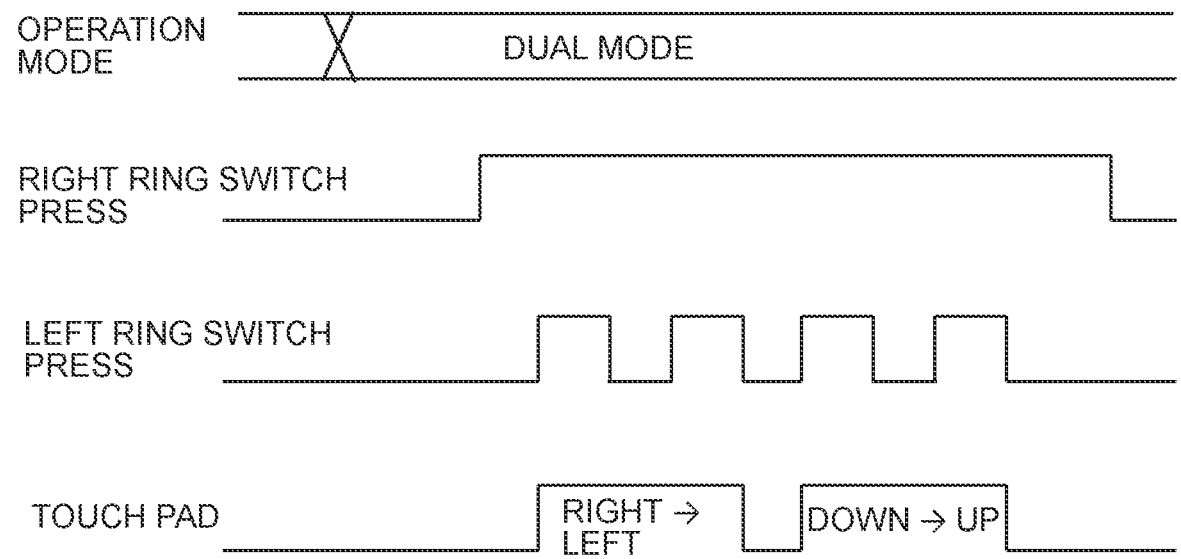
FIG. 16 is a diagram showing another operation for switching the operation mode in the dual mode in the embodiment.

In addition, FIG. 16 is a diagram showing still another operation for switching the operation mode in the dual mode in the present embodiment. As shown in FIG. 16, in the dual mode state, a mode is defined in which the press switch of the right ring-type controller is long-pressed and the left ring-type controller is operated within the period. For example, in a mode in which the cursor moves while the press switch of the left ring-type controller is being pressed, if the operation of the left ring-type controller is performed while the press switch of the right ring-type controller is being long-pressed, definitions such as moving the cursor to twice the distance of normal operation can be made. In addition, instead of the press switch, an operation of touching the touch pad of the left ring-type controller and moving a finger can also be similarly defined.

In this manner, by operating the two ring-type controllers at the same time, it is possible to input different operations according to the relationship of the length of time during which each press switch is pressed or the timing of pressing, so that various operations can be defined by the cooperative operation of the operation inputs of the respective ring-type controllers.

Figure 17:
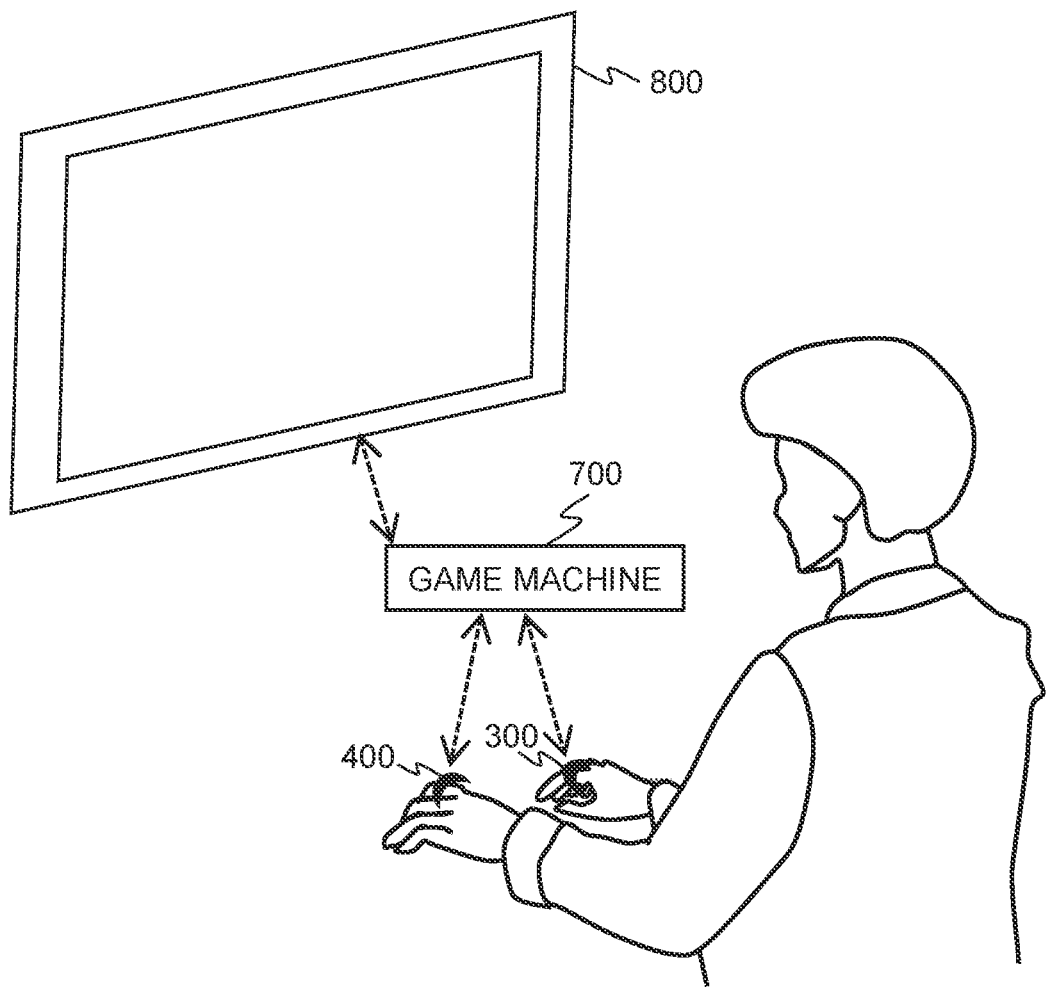
FIG. 17 is a diagram showing a configuration example of a game machine and a ring-type controller in the embodiment.

FIG. 17 is a diagram showing a configuration example when ring-type controllers are connected to a game machine. Two ring-type controllers are connected to a game machine 700 by communication, and it is possible to input the operation of the game machine 700 independently by the two ring-type controllers or in cooperation with each other. The output of the game machine is displayed on a TV 800. In this manner, it is also possible to use the ring-type controller as an operation input device for a game machine.

In addition, the ring-type controller described above is an external operation device for operating the HMD or the game machine, but may be a device worn on the body of the user who uses the HMD or the game machine because it is good if the burden of wearing on the user can be reduced. For example, a bracelet type or wristwatch type ring-type controller worn on the user's wrist may be used.

In addition, in the above description, an example is shown in which the ring-type controller is operated by being connected to the HMD or the game machine, but the devices to be operated are not limited to these. For example, a smartphone, a tablet PC (Personal Computer), and any device that can switch the operation according to input, such as an operation from a remote control device, can be applied.

As described above, according to the present embodiment, it is possible to provide an HMD system capable of reducing the burden of wearing on the user while improving operability by realizing various input operations on the HMD, an HMD used therefor, and an operation method therefor.

While the embodiment of the present invention has been described above, the present invention is not limited to the embodiment described above, and includes various modification examples. For example, the above embodiment has been described in detail for easy understanding of the present invention, but the present invention is not necessarily limited to having all the components described above. In addition, some or all of the components described above may be configured in hardware, or may be configured to be realized by executing a program using a processor.

REFERENCE SIGNS LIST

100 HMD
200 Smartphone
300 Right ring-type controller
400 Left ring-type controller
500 Server
600 External network
700 Game machine
800 TV
123 Short-range wireless communication device
130 Controller
131 CPU
132 Memory
133 Program
134 Information data
135 Operation control
150 Display
201 Push switch
202 Touch pad
203 Protrusion
204 LED
211 Acceleration sensor
212 Gyro sensor
213 Geomagnetic sensor
214 Touch pad sensor
215 Push switch detector
216 Short-range wireless communication device

The invention claimed is:

1. A head mounted display system comprising:
a head mounted display; and
a plurality of external operation devices connected to the head mounted display,
wherein the plurality of external operation devices include a first external operation device and a second external operation device,
wherein each of the first external operation device and the second external operation device is a device worn on a body of a user who uses the head mounted display,
wherein the head mounted display includes a short-range wireless communication unit and an operation control unit configured to communicate with the plurality of external operation devices through the short-range wireless communication unit,
wherein the first external operation device and the second external operation device respectively include a first press switch and a second press switch, and
wherein the operation control unit of the head mounted display executes a first predetermined operation mode based on a first number of times the first press switch is pressed, a duration of each of the first number of times the first press switch is pressed, a second number of times the second press switch is pressed, a duration of each of the second number of times the second press switch is pressed, and a timing of each of the first number of times the first press switch is pressed relative to a timing of each of the second number of times the second press switch is pressed.

2. The head mounted display system according to claim 1, wherein each of the first and second external operation devices includes a sensor for detecting movement.

3. The head mounted display system according to claim 2, wherein the operation control unit executes one of predetermined operations within the first predetermined operation mode based on a relative movement amount of each of the first and second external operation devices in the same coordinate system.

4. The head mounted display system according to claim 1, wherein the first external operation device and the second external operation device are a ring-type controller worn on the user's finger.

5. The head mounted display system according to claim 4, wherein each of the first external operation device and the second external operation includes a touch position sensor for detecting a position touched by a finger, so that a direction in which the touch position of the finger has moved can be detected and an operation of the head mounted display can be input according to a movement direction, and different operations are input according to a combination of a time during which the press switch of one of the first and second external operation devices is pressed and movement of the touch position of the finger on another of the first and second external operation devices.

6. The head mounted display system according to claim 1, wherein the operation control unit of the head mounted display switches from the first predetermined operation mode to a second predetermined operation mode based on a third number of times the first press switch is pressed, a duration of each of the third number of times the first press switch is pressed, a fourth number of times the second press switch is pressed, a duration of each of the fourth number of times the second press switch is pressed, and a timing of each of the third number of times the first press switch is pressed relative to a timing of each of the fourth number of times the second press switch is pressed.

7. A head mounted display being connected to a plurality of external operation devices including a first external operation device and a second external operation device, the head mounted display comprising:
a short-range wireless communication unit; and
an operation control unit,
wherein the first and second external operation devices are worn on a body of a user who uses the head mounted display,
wherein the operation control unit communicates with the first external operation device and the second external operation device through the short-range wireless communication unit,
wherein the first and second external operation devices respectively include a first press switch and a second press switch, and
wherein the operation control unit of the head mounted display executes a first predetermined operation mode based on a first number of times the first press switch is pressed, a duration of each of the first number of times the first press switch is pressed, a second number of times the second press switch is pressed, a duration of each of the second number of times the second press switch is pressed, and a timing of each of the first number of times the first press switch is pressed relative to a timing of each of the second number of times the second press switch is pressed.

8. The head mounted display according to claim 7, wherein the operation control unit executes one of predetermined operations within the first predetermined operation mode based on a relative movement amount of each of the first and second external operation devices in the same coordinate system.

9. The head mounted display according to claim 7, wherein the operation control unit of the head mounted display switches from the first predetermined operation mode to a second predetermined operation mode based on a third number of times the first press switch is pressed, a duration of each of the third number of times the first press switch is pressed, a fourth number of times the second press switch is pressed, a duration of each of the fourth number of times the second press switch is pressed, and a timing of each of the third number of times the first press switch is pressed relative to a timing of each of the fourth number of times the second press switch is pressed.

10. A method for operating a head mounted display, wherein the head mounted display can be connected to a plurality of external operation devices including first and second external operation devices worn on a body of a user who uses the head mounted display, and the first and second external operation devices respectively including a first press switch and a second press switch, the method comprising:
executing a first predetermined operation mode based on a first number of times the first press switch is pressed, a duration of each of the first number of times the first press switch is pressed, a second number of times the second press switch is pressed, a duration of each of the second number of times the second press switch is pressed, and a timing of each of the first number of times the first press switch is pressed relative to a timing of each of the second number of times the second press switch is pressed.

11. The method for operating a head mounted display according to claim 10, wherein one of predetermined operations is executed within the first predetermined operation mode based on a relative movement amount of each of the first and second external operation devices in the same coordinate system.

12. The method for operating a head mounted display according to claim 10, further comprising:
switching from the first predetermined operation mode to a second predetermined operation mode based on a third number of times the first press switch is pressed, a duration of each of the third number of times the first press switch is pressed, a fourth number of times the second press switch is pressed, a duration of each of the fourth number of times the second press switch is pressed, and a timing of each of the third number of times the first press switch is pressed relative to a timing of each of the fourth number of times the second press switch is pressed.

* * * * *